US012605693B2

(12) United States Patent
Zhou et al.

(10) Patent No.: US 12,605,693 B2
(45) Date of Patent: Apr. 21, 2026

(54) PROCESS, SYSTEM, AND APPARATUS FOR REDUCING ENVIRONMENTAL POLLUTANTS FROM A MOBILE PHASE

(71) Applicant: ALBEMARLE CORPORATION, Charlotte, NC (US)

(72) Inventors: Qunhui Zhou, Concord, CA (US); Kim Seyhe Pingree, Baton Rouge, LA (US); Jon E Miller, Baton Rouge, LA (US); Sascha J Welz, Phoenix, AZ (US)

(73) Assignee: Albemarle Amendments, LLC, Charlotte, NC (US)

( * ) Notice: Subject to any disclaimer, the term of this patent is extended or adjusted under 35 U.S.C. 154(b) by 0 days.

(21) Appl. No.: 18/053,831

(22) PCT Filed: May 11, 2021

(86) PCT No.: PCT/US2021/031800
§ 371 (c)(1),
(2) Date: Nov. 9, 2022

(87) PCT Pub. No.: WO2021/231442
PCT Pub. Date: Nov. 18, 2021

(65) Prior Publication Data
US 2024/0058787 A1 Feb. 22, 2024

Related U.S. Application Data

(60) Provisional application No. 63/023,137, filed on May 11, 2020.

(51) Int. Cl.
B01D 53/64 (2006.01)
B01J 20/20 (2006.01)
(Continued)

(52) U.S. Cl.
CPC .............. *B01J 20/20* (2013.01); *B01D 53/64* (2013.01); *B01J 20/3236* (2013.01); *C02F 1/283* (2013.01); *C02F 1/288* (2013.01)

(58) Field of Classification Search
CPC .... B01J 20/20; B01J 20/3236; B01J 2220/58; B01J 2220/66; B01J 20/027;
(Continued)

(56) References Cited

U.S. PATENT DOCUMENTS 5,202,301 A * 4/1993 McNamara .......... B01J 20/0251
502/181
6,953,494 B2 * 10/2005 Nelson, Jr. ............. B01D 53/64
95/134
(Continued)

FOREIGN PATENT DOCUMENTS

CN 106914222 A * 7/2017
WO 2019046882 A1 3/2019
WO WO-2019213615 A1 * 11/2019 .............. B01J 20/10

OTHER PUBLICATIONS

English Translation of Patent Publication Cn 106914222A, published Jul. 4, 2017. (Year: 2017).*

*Primary Examiner* — Joseph W Drodge
(74) *Attorney, Agent, or Firm* — Nathan C. Dunn

(57) ABSTRACT

The disclosure relates to reactive media containing a brominated sorbent that can adsorb environmental pollutants, including mercury, and can prevent or limit the loss of the absorbed pollutant in the presence of a mobile media. Systems, devices and processes that utilize this adsorption and retention in the presence of a flowing media are described.

17 Claims, 5 Drawing Sheets

(51) Int. Cl.
　　*B01J 20/32*　　　　(2006.01)
　　*C02F 1/28*　　　　(2023.01)
(58) Field of Classification Search
　　CPC . B01J 20/28016; B01J 2220/56; B01D 53/64;
　　　　　　C02F 1/281; C02F 1/288; C02F 1/283;
　　　　　　C02F 2101/20; C02F 2103/001; C02F
　　　　　　2103/007; C02F 2201/008; C02F 1/58;
　　　　　　　　　　　　　　　　　C02F 2103/06
　　See application file for complete search history.

(56) References Cited

U.S. PATENT DOCUMENTS

| | | | |
|---|---|---|---|
| 2004/0003716 A1* | 1/2004 | Nelson, Jr. | B03C 3/013 |
| | | | 95/134 |
| 2005/0161407 A1* | 7/2005 | McPhillips | C05G 5/16 |
| | | | 210/507 |
| 2005/0247635 A1* | 11/2005 | Vo | B01J 20/18 |
| | | | 210/685 |
| 2007/0246419 A1* | 10/2007 | Milosavljevic | B01J 20/28023 |
| | | | 210/284 |
| 2008/0011683 A1 | 1/2008 | Dong et al. | |
| 2009/0011222 A1 | 1/2009 | Xiu et al. | |
| 2011/0048982 A1 | 3/2011 | Hurt et al. | |
| 2014/0217037 A1* | 8/2014 | Theivendran | C02F 1/50 |
| | | | 210/753 |
| 2015/0185194 A1 | 7/2015 | Prince et al. | |
| 2016/0114308 A1* | 4/2016 | Despen | B01J 20/0203 |
| | | | 502/406 |
| 2017/0259208 A1* | 9/2017 | Stuhler | B01D 53/64 |
| 2017/0296959 A1* | 10/2017 | Stuhler | B01D 46/0036 |
| 2018/0161725 A1* | 6/2018 | Klidas | B01D 53/8631 |
| 2018/0229182 A1* | 8/2018 | Olson | B01J 20/04 |

* cited by examiner

PROCESS, SYSTEM, AND APPARATUS FOR REDUCING ENVIRONMENTAL POLLUTANTS FROM A MOBILE PHASE

CROSS-REFERENCE TO RELATED APPLICATIONS

This application, filed May 11, 2021, under 35 U.S.C. § 119(e), claims the benefit of U.S. Provisional Patent Application Ser. No. 63/023,137, filed May 11, 2020, entitled "PROCESS, SYSTEM, AND APPARATUS FOR REDUCING ENVIRONMENTAL POLLUTANTS FROM A MOBILE PHASE," the entire contents and substance of which are hereby incorporated by reference as if fully set forth below.

TECHNICAL FIELD

The various embodiments of the disclosure relate generally to processes, devices, and systems for remediating a mobile phase. It is particularly useful for removing a pollutant from a mobile phase to protect the flow of the mobile phase to a less polluted or unpolluted location, and is particularly effective for a mobile phase with a non-neutral pH.

BACKGROUND

Many pollutants are known be toxic to humans and to the environment. One of these known environmental pollutants, mercury, has been categorized as one of the priority hazardous substances by the Agency for Toxic Substances and Disease Registry (the "ATSDR"). The US National Priorities List (NPL) has listed numerous sites that were contaminated by mercury, such sites comprising various substances, including solids (e.g., soil, debris, waste, and other solids), liquids (e.g., groundwater, lakes, ponds, and other liquids), and combinations of solids and liquids (e.g., sludge, slurries, sediments, and other combinations of solids and liquids). The majority of these sites have not been de-contaminated to remove mercury. Unacceptable levels of mercury or mercury compounds may also be present in sites not listed in the NPL. Other environmental pollutants raise similar concerns.

One factor that challenges some remediation technologies is the tendency for an environmental pollutant to migrate from (or leach out of) its location after it has been sequestered or stabilized. The U.S. EPA regulates this as well, and has a Toxicity Characteristic Leaching Procedure (TCLP), a test designed to determine the mobility of both organic and inorganic analytes present in liquid, solid, and multiphasic wastes.

A new process and application for reducing environmental pollutants was disclosed in PCT/US2019/PCT/030729, filed on May 3, 2019, the contents of which are incorporated by reference herein in their entirety. During the development and application of that process, a need was identified for situations where liquids were flowing or moving in an environmental pollution site which could carry environmental pollutants beyond that location. In fact, one of the challenges with remediating a polluted site is that ground water, storm run-off, and other liquid flows can carry the environmental pollutant beyond the boundaries of the site or location, and preventing those flows from carrying pollutants is a continuing need in the industry.

BRIEF SUMMARY

The various embodiments of the disclosure relate generally to processes, apparatus, devices, and systems for removing environmental pollutants from a mobile media, mobile phase, or mobile flow.

An embodiment of the disclosure can be a remediation device for removing environmental pollutants from a mobile phase, comprising one or more channels that the media flows through, one or more solid structures proximate to the channels, and a reactive media on the solid structure, wherein the reactive media comprises a halogen-containing sorbent.

An embodiment of the disclosure can be a system for remediating a site, wherein the site has an environmental pollutant to remediate and a mobile phase, the system comprising a contaminated mobile phase flowing from the site of the environmental pollutant, a treated mobile phase, and a remediation device between the contaminated mobile phase and the treated mobile phase that is configured and disposed to intercept the flow of the contaminated mobile phase.

An embodiment of the disclosure can be a process for removing or reducing an environmental pollutant from a mobile media. The process can include installing a remediation device between a first location and second location, where the first location contains a higher level of the pollutant than the second location and the mobile phase has the potential to flow or does flow from the first location to the second location; and allowing the mobile phase to flow through the remediation device.

An embodiment of the disclosure can be a remediation device, including but not limited to a remediation device that is part of the system or in the process described above. The remediation device can be for removing environmental pollutants from a mobile phase. The remediation device can have one or more channels that the media flows through, one or more solid structures proximate to the channels, and a reactive media on the solid structure.

In an embodiment of the disclosure, the remediation can further include a support surrounding the solid structure and reactive media.

In an embodiment of the disclosure, the reactive media can include a halogen-containing sorbent. The reactive media can be a bromine-containing sorbent; a carbonaceous sorbent; a halogen-containing carbonaceous sorbent; a bromine-containing carbonaceous sorbent; or a bromine-containing activated carbon.

In an embodiment of the disclosure, the mobile phase can have a non-neutral pH. In some embodiments, the mobile phase can have a pH of less than about 6.5. In other embodiments, the mobile phase can have a pH of greater than about 7.5.

The previous embodiments of the disclosure can include that the environmental pollutant comprises a toxic metal, a toxic metal compound or toxic metal salt; or that the environmental pollutant comprises elemental mercury, a mercury compound or mercury salt.

The previous embodiments of the disclosure can include the remediation device that is a reactive cap, a permeable reactive barrier, a wattle, or a purification column.

The previous embodiments of the disclosure can include the mobile media comprising a plume, surface water, overlay water, pore water, groundwater, tailings water, site runoff, and other formations within polluted locations.

DETAILED DESCRIPTION

Figure 1:
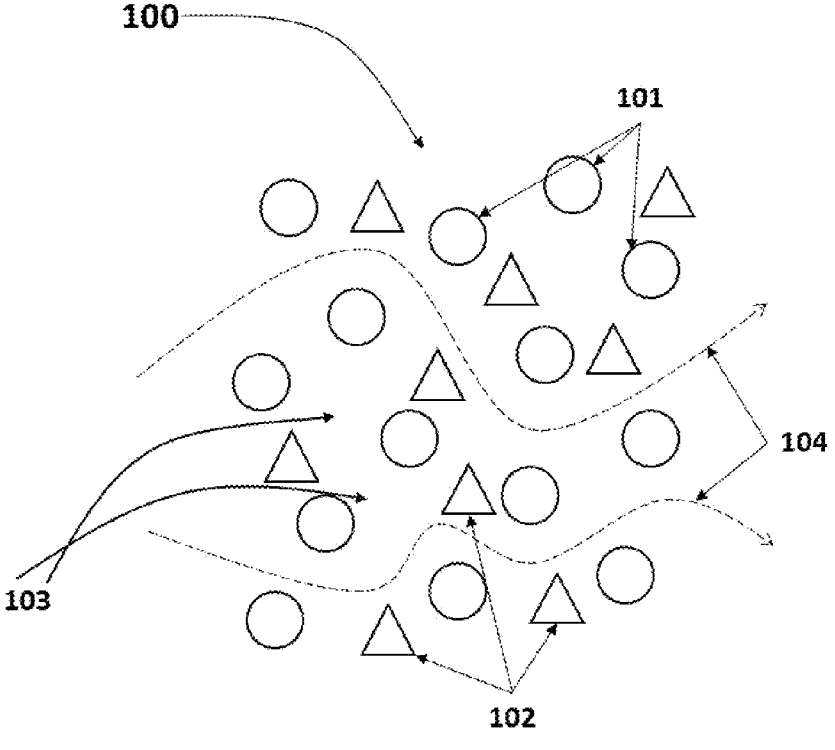
FIG. 1 illustrates a remediation device in accordance with an exemplary embodiment of the disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another embodiment includes from the one particular value and/or to the other particular value.

By "comprising" or "comprising" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosure relates generally to devices, systems and processes or methods for preventing or reducing an environmental pollutant from exiting a site or location. The disclosure includes the application of a halogenated sorbent in the devices, systems, methods, and processes that captures the environmental pollutant and prevents its further elution or migration into a mobile phase that flows around, through or otherwise past the halogenated sorbent.

The overall absorptive capacity of a sorbent for a sorbate can be an important factor in selecting a material. If the sorbate does not have an affinity for the sorbent in the first instance, then its application can be problematic. And, even when a sorbate has a high affinity for a sorbent, the sorbent can ultimately reach its maximum capacity for the sorbate, e.g. become saturated, and the sorbate can ultimately break through the sorbent. However, even before saturation of the sorbent with the sorbate, a desirable sorbent should not lose its ability to hold the sorbate under operating conditions.

This issue can be particularly true when a mobile media, or mobile phase, is flowing past the adsorbed sorbate. One challenge with any absorptive process can be any equilibrium for the sorbate between the sorbent and a mobile phase flowing by or across the sorbent. If the sorbate spends time passing between the mobile phase and the adsorbed phase, then the sorbate can migrate downstream along the flow of the mobile media and can ultimately escape the sorbent material. For remediation, this mobility can be a significant issue if the pollutant can equilibrate between a flowing fluid and the sorbent surface. Any mobile phase at an environmental site can therefore be a challenge to the sorbent material.

Moreover, in many operations, e.g. industrial, construction, demolition, mining and remediation sites, the pH of the mobile phase is not necessarily neutral, so a sorbent that can resist a challenging mobile phase, for example one having a high pH or a low pH, would be particularly valuable.

The process disclosed in PCT/US2019/PCT/030729 included a halogenated sorbent that we have continued to develop. In testing the application of that disclosure to environmental challenges, we have demonstrated that not only does it competitively adsorb pollutants, but that it does not have a significant weakness for losing the adsorbed pollutant when challenged with a series of mobile media. As described in Example 1, one aspect of the product includes a halogenated activated carbon sorbent that has adsorbed environmental mercury. When challenged with a liquid flow of neutral pH water, pH 4 water and pH 8-11 water, over 40 days, no mercury was released from the sorbent. In contrast, powdered activated carbon, which is one of the common materials applied in remediation technologies, showed mercury elution in just 4 days, during a neutral pH flow.

The reactive media, also referred to herein as remediation agents, can be halogen-containing sorbents, sometimes referred to herein as "halogenated sorbents". Halogen-containing sorbents are typically formed from one or more halogen-containing compounds, and one or more substrate materials. Many substrate materials, especially activated carbons, are available or obtainable in a wide range of particle sizes, from nanometer to centimeter.

Thus, this disclosure provides processes for reducing the environmental availability of environmental pollutants, especially in locations where there is a mobile phase or mobile media. As used throughout this document, the term "reducing environmental availability" refers to stabilizing, immobilizing, fixing, encapsulating, isolating, containing, destroying, detoxifying, decomposing, and decaying, reducing the amount of, reducing the mobility of, and/or reducing the migration ability of, at least one environmental pollutant. The stabilizing and/or immobilizing can be in a medium. Reducing the environmental availability of environmental pollutants in turn reduces the bio-availability of pollutants and thus their bio-accumulation.

As used herein, the terms "environmental pollutant" and "environmental pollutants" means a chemical element or compound or mixture thereof known be harmful humans and/or to impact the environment (ecosystem). Environmental pollutants are typically regulated by one or more government agencies. Examples of environmental pollutants include mercury in all of its forms, e.g., elemental mercury, organic mercury compounds, and inorganic mercury compounds; other organic matter (including, for example, without limitation, hydrophobic organic compounds, polycyclic aromatic hydrocarbons, polychlorinated biphenyls, dioxins, furans, and/or chlorinated pesticides); hazardous elements, organic and inorganic heavy metal compounds (including, for example, without limitation, compounds comprising As, Pb, Zn, Cu, Cr, and/or Cd); and other environmental pollutants known to those skilled in the art.

As used throughout this document, terms such as "treated", "contacted", and "remediated" indicate that the halogen-containing sorbent interacts with the substance containing one or more environmental pollutants in a manner that results in the reduction of environmental availability of one or more environmental pollutants.

The device, system or process can include a remediation device having one or more channels, one or more solid structures and a reactive media on the structures. The remediation device has channels that can be large or small and can be found between the solid structures. For example, channels can include the spaces between, for example, straw in a bundle of material, or can be much smaller, for example the space in between particles packed in a column or other structure. The channels can be the space between the solid structures that make up the supporting structure of the device.

The remediation device can also include a support surrounding and holding the one or more solid structures and reactive media. The support can have one or more inlets and outlets through which the mobile phase can pass. The one or more inlets and outlets can be a typical opening within the bottom, top and/sides of the support, or can include a mesh material, such as a mesh bag.

Figure 2:
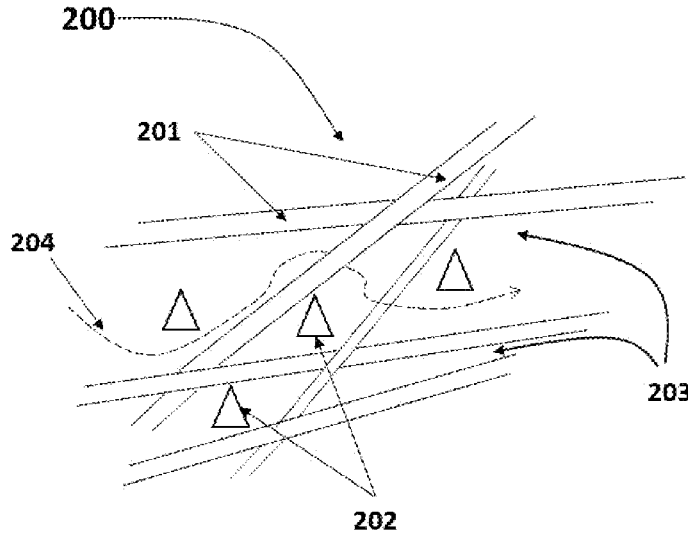
FIG. 2 illustrates a remediation device in accordance with an exemplary embodiment of the disclosure.

As an example, the remediation device 100 in FIG. 1 could include solid structures 101, such as a sand or other particulate material, and reactive media 102 supported by the solid structures 101. The channels 103 within the remediation device can be found between the solid structures 101 and reactive media 102. The mobile phase 104 can then pass through the channels, allowing it to interact with the reactive media. Similarly, a remediation device ins FIG. 2 could have solid structures 201, such as a straw or fibrous material, and reactive media 202 supported by the solid structures 201. The channels 203 within the remediation device can be found between the solid structures 201 and reactive media 202. The mobile phase 204 can then pass through the channels, allowing it to interact with the reactive media.

Figure 3:
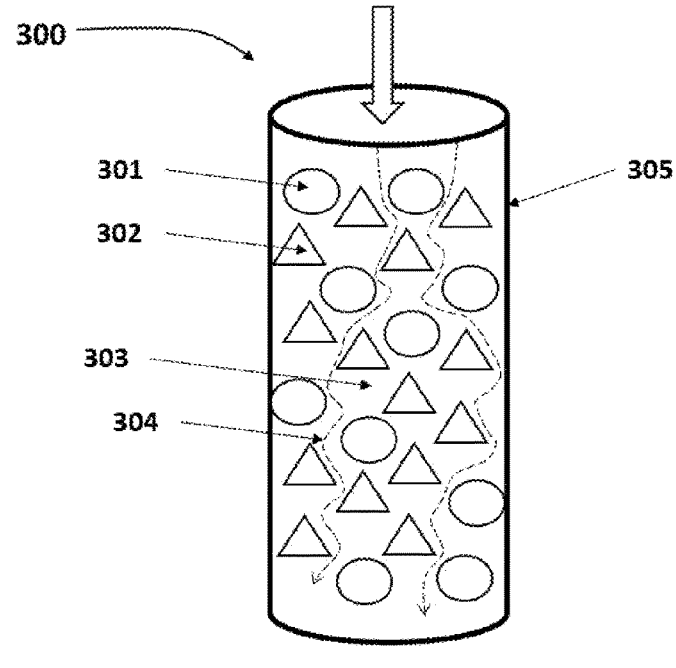
FIG. 3 illustrates a remediation device in accordance with an exemplary embodiment of the disclosure.

Another example of a remediation device can be a cylindrical container, such as in FIG. 3. The container should not be limited to a cylinder, but can be any three-dimensional shape. The remediation device 300 can include solid structures 301, reactive media 302, channels 303, and mobile phase 304. The device in FIG. 3 also demonstrates support 305, which can be a solid or a porous material as discussed above. The mobile phase can enter through the top of the device, as shown by the arrow in FIG. 3, but can also enter through the bottom. Alternatively, while FIG. 3 is should as a cylinder with top and bottom openings, the support can be a porous material and the mobile phase could instead flow through the sides.

The reactive media on the solid structures can be a halogen-containing sorbent as described herein. The reactive media comprise bromine-containing sorbent, carbonaceous sorbent, halogen-containing carbonaceous sorbent and/or a bromine-containing activated carbon.

Mobile media can also be described as the mobile phase, mobile flow, the liquid phase, or the liquid media. Generally for environmental remediation and environmental pollution, the mobile media will comprise water, e.g. an aqueous solution, but does not exclude the presence of organic compounds or solvents, which can be common in remediation sites. Examples of mobile media can include a plume, surface water, overlay water, pore water, groundwater, tailings water, site runoff, and/or storm water.

Environmental remediation of mobile liquids flows can be particularly difficult for current products because the mobile phase is not pH neutral, i.e. does not exist at pH 7. These contaminated sites often have an acidic pH, and more often have a basic pH, and these liquids often need to be treated or neutralized. Otherwise, the pollutant adsorbed on a sorbent will simply off, leading to leaching or breakthrough of the environmental pollutant from the sorbent. In contrast, the remediation devices of this disclosure are resilient against non-neutral pH mobile phase, and can resist leaching of the environmental pollutant when the pH is acidic or basic. Thus, the mobile media or mobile phase can have a non-neutral pH. The pH of the mobile phase can be at least below pH 6.5, below pH 6.0, below pH 5.5 or below pH 5.0. The pH of the mobile phase can be at least above pH 7.5, above pH 8.0, above pH 8.5, above pH 9.0 or above pH 9.5.

The environmental pollutant can be any pollutant described herein. It can include a toxic metal, a toxic metal compound or toxic metal salt, or can include elemental mercury, a mercury compound or mercury salt.

The sorbent materials applied herein can include carbonaceous materials and inorganic materials. Suitable carbonaceous materials include, for example, without limitation, activated carbon, carbon black, char, and coke. A preferred carbonaceous material is activated carbon, which can be used in many forms including, for example, without limitation, powdered, granular, or extruded; and high specific surface area.

Suitable inorganic materials include inorganic oxides such as alumina (amorphous and crystalline), silica, magnesia and titania; natural zeolites, such as chabazite, clinoptilolite, and faujasite; synthetic zeolites, such as synthetic chabazite, zeolites with high Si:Al ratios (ZSM-5, beta zeolites, sodalite), zeolites with moderate Si:Al ratios (Y zeolites, A zeolites), silica alumina phosphate (SAPO) zeolites, ion exchanged zeolites, uncalcined zeolites, clay minerals such as kaolin, kaolinite, bentonite, and montmorillonite; inorganic hydroxides such as iron hydroxide; mixed metal oxides such as hydrotalcites and metallated double layered clays; diatomaceous earth; cement dust; hydroprocessing catalysts including those on substrates such as alumina, silica, or titania; $CaCO_3$; and combinations of any two or more of the foregoing. Preferred inorganic materials include inorganic oxides, especially silica, natural zeolites, especially chabazite, and clay minerals, especially kaolinite and bentonite; $CaCO_3$ is also a preferred substrate material.

The halogen element in the halogen-containing sorbent can be fluorine, chlorine, bromine, iodine, or a mixture of any two or more halogens. Bromine is a preferred halogen. Suitable halogen-containing compounds include, for example, without limitation, elemental iodine and/or iodine compounds, elemental bromine and/or bromine compounds, elemental chlorine and/or chlorine compounds, elemental fluorine and/or fluorine compounds, and other suitable halogen compounds, as will be known to those skilled in the art. Types of halogen-containing compounds that can be used include hydrohalic acids, alkali metal halides, alkaline earth halides, and ammonium halides.

Hydrohalic acids include hydrogen chloride, hydrogen bromide, and hydrogen iodide. Alkali metal halides include sodium fluoride, sodium chloride, sodium bromide, sodium iodide, potassium fluoride, potassium chloride, potassium bromide, and potassium iodide. Alkaline earth halides include magnesium chloride, magnesium bromide, calcium chloride, and calcium bromide. Ammonium halides include ammonium chloride, ammonium bromide, and ammonium iodide.

Preferred halogen-containing compounds include elemental bromine, hydrogen bromide, sodium chloride, sodium bromide, potassium iodide, and calcium bromide. Bromine-containing compounds are preferred halogen-containing compounds; more preferred are hydrogen bromide and elemental bromine, especially elemental bromine.

Halogen-containing sorbents can be made from the material and halogen-containing compounds as described in U.S. Pat. Nos. 6,953,494 and 9,101,907, and in International Patent Pub. No. WO 2012/071206. In some embodiments, preferred halogen-containing sorbents are bromine-containing sorbents. In some embodiments, preferred halogen-containing sorbents are halogen-containing activated carbons. In other embodiments, preferred halogen-containing activated carbons are chlorine-containing activated carbons, bromine-containing activated carbons, and iodine-containing activated carbons. In preferred embodiments, the halogen-containing sorbents are chlorine-containing activated carbons and bromine-containing activated carbons. In more preferred embodiments, the halogen-containing sorbents are bromine-containing activated carbons In other embodiments, preferred halogen-containing sorbents are chlorine-containing activated carbons and iodine-containing activated carbons. In still other embodiments, preferred halogen-containing sorbents are halogen-containing chabazites, halogen-containing bentonites, halogen-containing kaolinites, and halogen-containing silicas.

Halogen-containing sorbents, especially bromine-containing sorbents, more especially bromine-containing sorbents, can reduce environmental availability of pollutants in substances through means including, for example, without limitation, oxidation and/or adsorption. Adsorption can reduce the environmental availability of environmental pollutants by reducing mobility of such pollutants. Other ways in which halogen-containing sorbents can reduce environmental availability of pollutants are by enhancing the degradation of such pollutants through surface reactions; and/or by inhibiting the formation of pollutants such as methyl mercury; and/or by other mechanisms. In the processes of this disclosure, whether applied to solids, or liquids, or combinations thereof, the environmental pollutants adsorbed by halogen-containing sorbents are stabilized such that desorption into the environment is substantially minimized.

Mercury and other environmental pollutants are adsorbed onto or removed by halogen-containing sorbents, especially bromine-containing activated carbon. Different halogen (especially bromine) species can be formed on a halogen-containing sorbent, especially bromine-containing sorbents, particularly bromine-containing activated carbon.

Some halogen-containing sorbents, particularly bromine-containing activated carbons, can physically and chemically adsorb mercury of different oxidation states including elemental mercury, oxidized mercury, and organic mercury. Mercury adsorbed on bromine-containing activated carbon is stable in a wide range of pH values, where "stable" means that the mercury does not separate from the sorbent in appreciable amounts after adsorption.

The disclosure herein includes many of the media or locations where environmental pollution, and especially, mercury contamination, can be found and can provide remediation techniques that can be used generally for treatment of contaminants found in this media. The listed techniques may be not all currently used successfully for mercury remediation, but with the novel amendment, and methods claimed here, feasible remediation technique can be achieved. Those media and locations can include permeable reactive barriers, reactive caps, filter beds, adsorption tanks, reactive wattles, pump and treat, storm water percolation systems, and other reactive media.

Thus, the disclosure can also include a system for remediating a site containing an environmental pollutant and a mobile phase that can flow out of a localized pollution site. The system can include a contaminated mobile phase flowing from the site of the environmental pollutant, a treated mobile phase, and a remediation device between the contaminated mobile phase and the treated mobile phase that is configured and disposed to intercept the flow of the contaminated mobile phase and treat the mobile phase. The remediation device can have a channel that the mobile phase flows through, a solid structure proximate to the channel, and a reactive media on the solid structure. The reactive media can be as described above.

Figure 4:
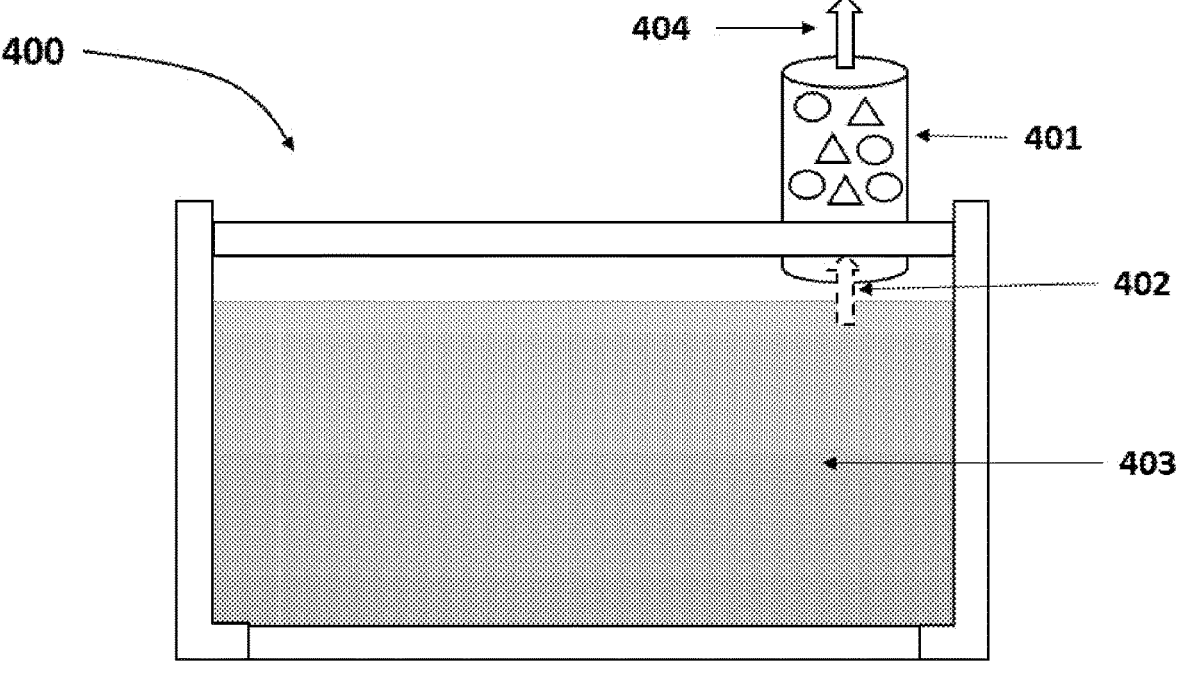
FIG. 4 illustrates a system in accordance with an exemplary embodiment of the disclosure.

FIG. 4 demonstrates a system having a filter device. The system 400 can include the remediation device 401, and a contaminated mobile phase 402 flowing out of a retention pond 403. When water from an external source, such as a rain storm, flows into the retention pond, contaminated mobile phase 402 might be forced up through the remediation device 401, but the mobile phase would pass through the remediation device 401 and treated mobile phase 404 would flow out of the remediation device.

Another example can be a wattle having the sorbent bound within it. A wattle can be used to prevent soil erosion or redirect a portion of runoff. It is often a temporary means to control soil erosion during civil works, but in some cases, wattles can be used for longer periods of time. A typical wattle can be straw inserted into a cylindrical tube of burlap. In practice the wattle is laid on the surface of the ground perpendicular to the direction of water flow. Examples are wattle laid across a swale, across a soil or tailings bank, around a drain, or where rivulets enter a stream.

The disclosure can include as a remediation device a wattle that includes the halogenated sorbent, which can adsorb environmental pollutants such as mercury from water as it passes through a soil erosion barrier or wattle.

A halogenated sorbent wattle can be a mixture of straw and halogenated sorbent, or be filled only with halogenated sorbent. The outer tube material of the wattle can be burlap, natural cloth, synthetic cloth, or synthetic felted material. The outer tube material can also be natural or synthetic fabric or felt that has been impregnated with activated carbon or halogenated sorbent. The size of the halogenated sorbent granules can be generally larger than the weave openings in the tube material, so that the granules generally stay inside the tube.

Figure 5:
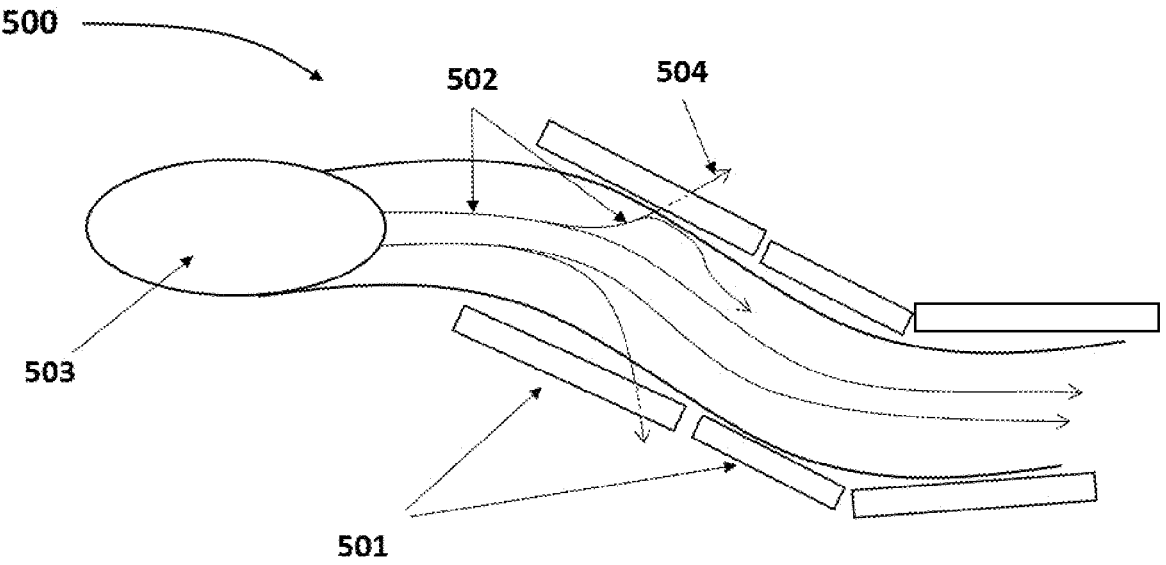
FIG. 5 illustrates a system in accordance with an exemplary embodiment of the disclosure.

FIG. 5 demonstrates a system having wattle. A system 500 can include the remediations devices 501 lining a surface through which liquid might flow. A contaminated mobile phase 502 can flow out of a polluted site 503, for example a holding pond at a mining site. The contaminated mobile phase produced during an overflow or leakage event can be directed along a certain course by lining the course with wattles. Any contaminated mobile phase 502 passing through the remediation devices 501, e.g. through a wattle, would produce a treated mobile phase 504.

Another example of a remediation device can include permeable reactive barriers (PRB), where the halogenated sorbent can be included in the PRB. For example, in mercury applications, permeable reactive barriers can be used to stop mobilization of mercury from a contaminated site and allow a party to meet groundwater regulations. This can be a preferred approach for the party, because it is much cheaper than stabilizing or removing the source mercury. In some cases such as tailings banks, source stabilization by mixing in amendment creates a risk of tailings runoff into stream or valley. Storm water percolation barriers are similar, but designed to remove mercury from storm water and stop methylation in the storm water system media.

PRBs can be designed to adsorb or react with mobile contaminates which in most cases will be water soluble forms of the contaminate. In the case of mercury, the species likely to reach a PRB are ionic $Hg^{+2}$ or forms of organic mercury, including methyl mercury.

PRBs can be designed for reactivity of roughly 10 years or longer. This span of time is considered economical for replacement of PRBs. For situations where reactivity cannot reach substantial time periods, the pump and treat technique is an alternative ground water mitigation approach at some sites.

Another example of a remediation device can include reactive capping applications. Reactive caps can be frequently used to stop pollutants from leaving contaminated soil/sediment and entering over-water or surface water. Reactive caps can be used on water bottoms, land, and tailings piles, to name a few. This can be often an attractive approach to meeting surface water regulations, because it can be much cheaper than stabilizing or removing the source mercury. In some cases, such as tailings banks, source stabilization by mixing in amendment creates a risk of tailings runoff into stream or valley, so capping the tailings piles are an alternative.

In both reactive caps and PRBs, the technique of is similar, except that caps treat water upwelling from the media below, whereas PRBs can often be placed in the path of a flowing media. The common environmental pollutant in both can be a metal species that is ionic, and the halogenated sorbent of the disclosure has the verified ability to adsorb ionic/inorganic pollutants, and also resists loss of the pollutant as the flowing media passes it.

The disclosure can also include a process for removing or reducing an environmental pollutant from a mobile media at a polluted site. The process can include installing a remediation device between a first location and second location at the polluted site. The first location would contain a higher level of the pollutant than the second location. The mobile phase or mobile phase has the potential to flow or does flow from the first location to the second location. The process allows for the mobile phase to flow through the remediation device from the first location to the second location. The remediation device includes devices as described above and throughout this application.

EXAMPLES

Example 1—Long Term Stability of Adsorbed Mercury in Dynamic System

Figure 6:
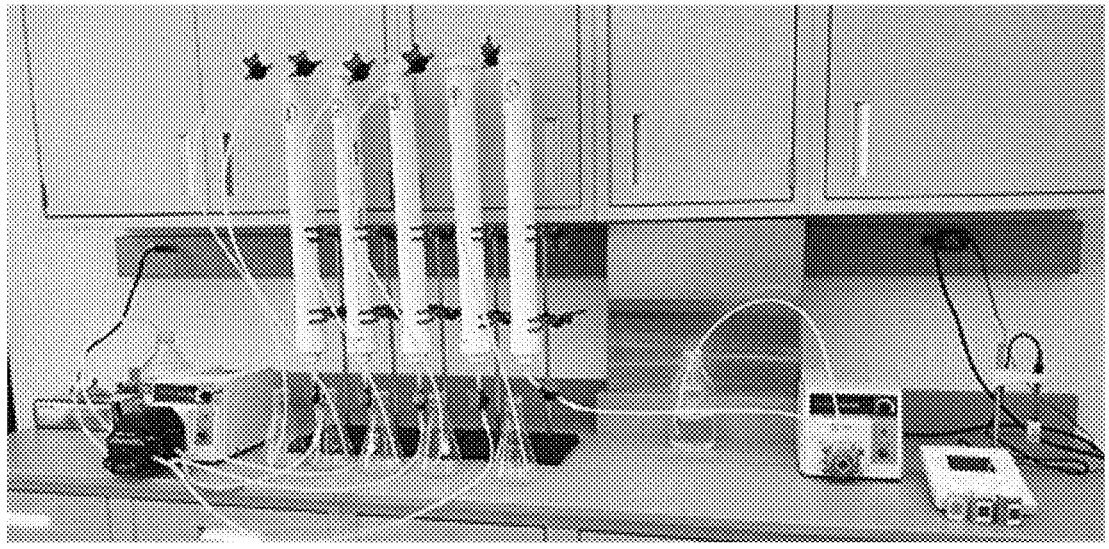
FIG. 6 illustrates a column step up for long term stability testing of adsorbed mercury in accordance with an exemplary embodiment of the disclosure.

Efficacy of Br-PAC to stabilize mercury in dynamic systems was study under column flow conditions. This column study focused on efficacy and stability under dynamic conditions as well as the longer term stability of adsorbed mercury under various pH conditions. The column testing method is used as part of an environmental leaching assessment for the evaluation of disposal, beneficial use, treatment effectiveness, and site remediation. The column setup is shown in FIG. 6.

This column study was designed to investigate the ability of two amendments (Br-PAC and PAC) to stabilize Total Hg in the soil and therefore to reduce the leachability of the mercury contamination, but also test their ability to remove extractable inorganic mercury ($Hg^{2+}$) from groundwater passed through the amended soil. A sandy soil having aged (decades-old) contamination with elemental mercury ($Hg^0$) was procured from an old munitions site, which was primarily contaminated with elemental mercury ($Hg^0$).

The contaminated soil was thoroughly homogenized in a glove box to minimize volatilization of $Hg^0$ and analyzed to establish baseline values of mercury content, particle-size distribution, moisture content, Total Organic Carbon (TOC), and pH. Soil analyses indicated that this soil contained $622\pm23.6$ (mg/Kg) of total mercury in coarse-grained (92% sand/8% silt) and it includes $9.9\pm0.8$ of moisture and nearly no natural organic materials (below 0.002 wt %) in neutral pH ($7.0\pm0.2$). Mercury species were further analyzed utilizing sequential extraction method according to EPA Method 3200 to isolate the four commonly recognized fractions of mercury. Potential mercury species from each extraction stage are listed in Table 1. Extractable (organic and inorganic) and semi-extractable portions are considered as "mobile form of mercury" while non-extractable/non-mobile portion is considered as "non-mobile form of mercury". Groundwater contains $102\pm5.9$ µg/kg of extractable inorganic mercury.

TABLE 1

| Analysis results (average of 6 samples, in mg/kg) of baseline concentrations in the homogenized test soil and groundwater. | | | | |
|---|---|---|---|---|
| Sample | Total Hg | Ex-tractable Organic[1] | Ex-tractable Inorganic[2] | Non-Ex-tractable, Semi-Mobile[3] | Non-Ex-tractable, Non-Mobile[4] |
| Soil | 622 ± | BD | 306 ± | 313 ± | 10.4 ± |
| (mg/Kg) | 23.6 | | 11.2 | 12.4 | 1.1 |
| Groundwater | 102 ± | BD | 100 ± | BD | BD |
| (µg/kg) | 5.9 | | 3.4 | | |

[1]Extractable Organic: $CH_3HgCl$, $CH_3CH_2HgCl$, Hg-NOM

[2]Extractable Inorganic: HgO, $HgCl_2$, $HgSO_4$, $Hg(OH)_2$, $Hg(NO_3)_2$, $Hg^{2+}$ complexes.

[3]Non-Extractable, Semi-Mobile: $Hg^0$-M, $Hg_2Cl_2$ (minor), $Hg^0$, $Hg^{2+}$ complexes.

[4]Non-Extractable, Non-Mobile: HgS, $Hg_2Cl_2$ (major), HgSe.

[5]BD = Below Detection (1.0 µg/kg)

TABLE 2

The four (4) reaction scenarios tested in the flow-through
column reactors, where Br-PAC is a brominated powdered activated
carbon and PAC is a powdered activated carbon.

| Column # | Amendment | Amendment Dose |
|----------|-----------|----------------|
| 1 | Control | None |
| 2 | Br-PAC | 1% (low dose) |
| 3 | Br-PAC | 2% (high dose) |
| 4 | PAC | 2% |

Four reaction scenarios were tested and each flow-through column was packed with treated soil listed in Table 2. After the one-day cure time for the treated soil in each column, one pore volume (400 mL) was replaced every day for 40 days by using peristaltic pumps. Up-flow pumping is used to minimize air entrainment and flow channeling. For first seven (7) days, groundwater that contains $102\pm5.9$ µg/kg of extractable inorganic mercury was passed through and then switched to acidic DI water (pH=4) in order to challenge the adsorbed mercury by Br-PAC since heavy metals tend to be more mobilized in acidic condition. After 28 days, eluent was switched to basic DI water (starting from pH 8 through pH 11) to evaluate if adsorbed mercury could be mobilized under severe pH alteration.

Figure 7:
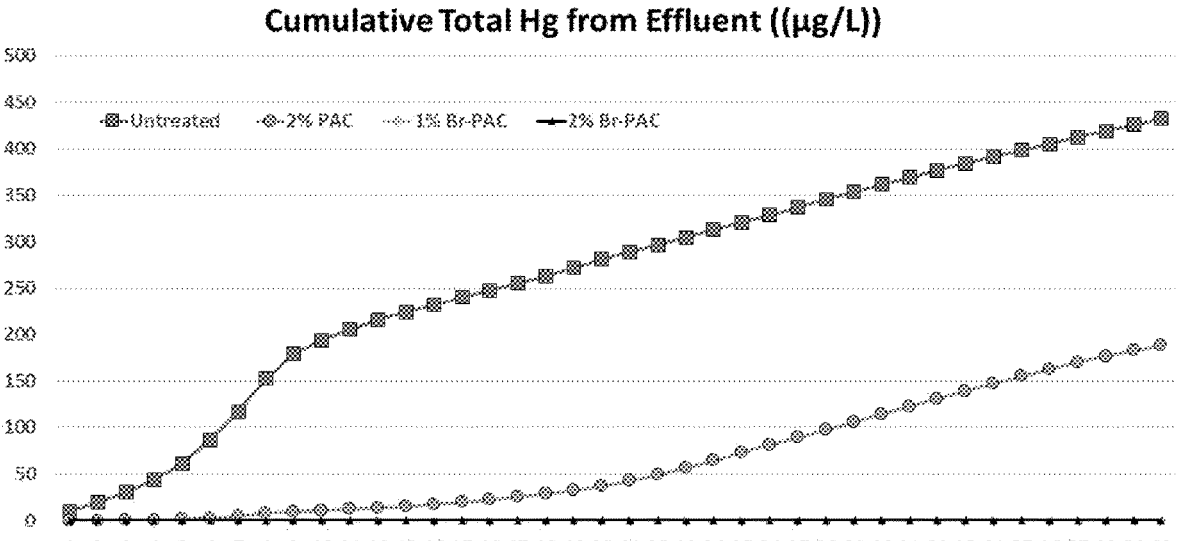
FIG. 7 illustrates a graph of cumulative mercury loss in the effluent from the stability testing in accordance with an exemplary embodiment of the disclosure.

FIG. 7 summarizes the cumulative total mercury from eluents collected every day for 40 days. For 40 days under various pH conditions, no mercury leached out from 1% and 2 wt % Br-PAC treated with soil. Breakthrough from a benchmark, PAC (2 wt %) and, was observed on day 4, and cumulative total mercury of eluents from PAC-treated columns significantly increased as the pH of the eluent changed.

Previous studies treating mercury contaminated soil with Br-PAC in batch reactors demonstrated that Br-PAC is effective in stabilizing or transforming all mercury species to the non-extractable/non-mobile fraction, which is the least leachable mercury fraction. This is consistent with previous batch reactor studies. This study also demonstrates (1) the exceptional capacity of Br-PAC to stabilize additional mercury in groundwater coming into the column as well as (2) the stability of the adsorbed mercury contamination in the soil even when a wide pH-range of groundwater passes through.

Figure 8:
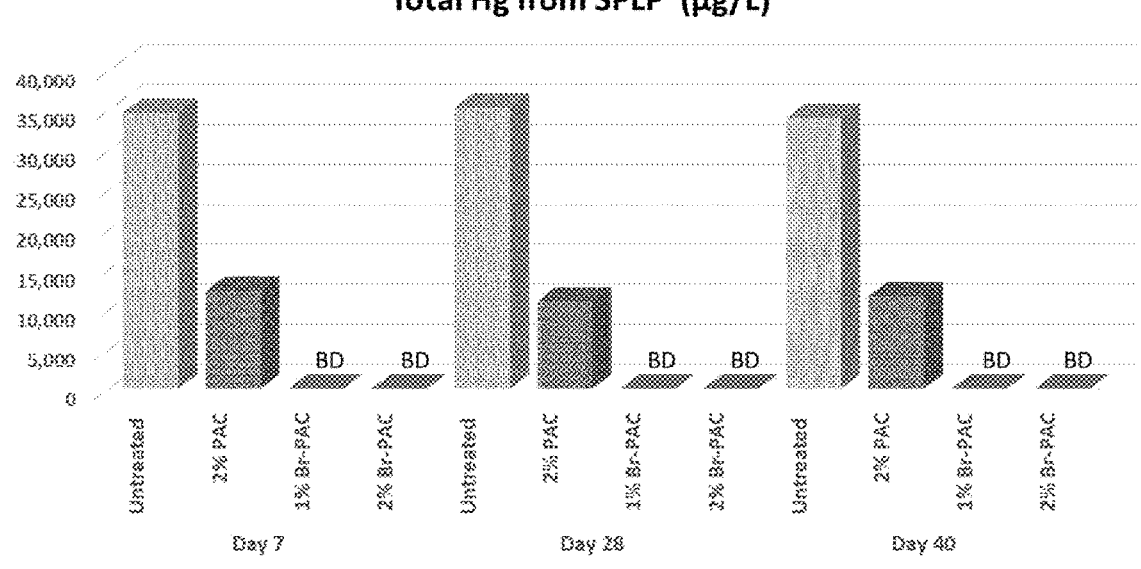
FIG. 8 illustrates a graph of the mercury concentrations (μg/L) in leachate from the soil after 7, 28 and 40 days for various sorbents, in accordance with an exemplary embodiment of the disclosure.

FIG. 8 demonstrates the mercury concentrations (ng/L) in SPLP leachate from the soil after 7, 28 and 40 days.

Stability of adsorbed mercury was further evaluated by performing SPLP leaching tests (Synthetic Precipitation Leaching Procedure, EPA Method 1312) after 7-day, 28-day and 40-day treatment. This EPA standard leaching procedures often used as one of main indicators that determine the success of in-situ mercury stabilization by evaluating the ability to stabilize mercury because only non-stabilized mercury is leached out by the leaching procedures. The SPLP is designed to mimic the leaching of contaminants exposed to normal weathering in situ by acid rain, which simulates leaching under conditions open to the atmosphere. Both 1% and 2 wt % Br-PAC treated soil stabilized mercury to non-detection level (1.0 ng/kg) while over 10,000 ng/L of mercury leached out from soil treated with 2 wt % of PAC. SPLP test results of soil samples from columns indicated that no measurable change of total mercury leached observed from all treated soils on 7-day, 28-day and 40-day treatment. (FIG. 8)

Figure 9:
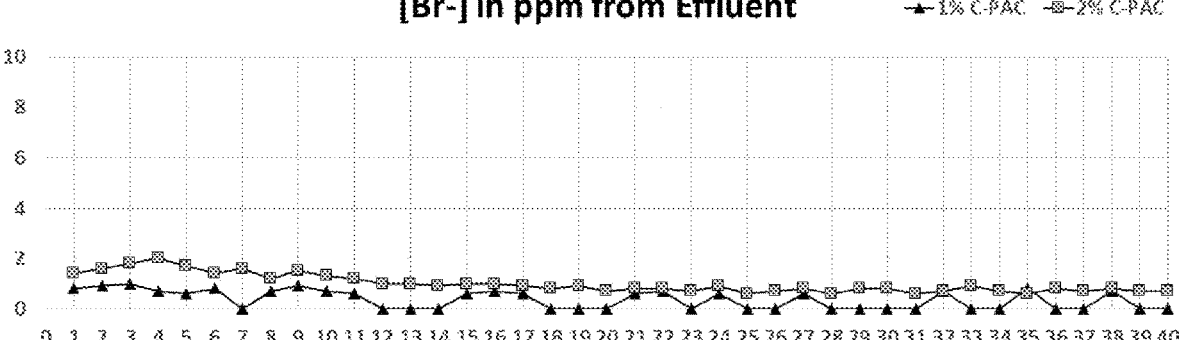
FIG. 9 illustrates a low bromine loss in the leachate, in accordance with an exemplary embodiment of the disclosure.

Another interesting outcome is total Bromide leached from eluents. Figure summarizes the concentration of Br— measured in the effluent from columns treated with 1 wt % and 2 wt % Br-PAC. Based on the dosage calculator, 1 wt % loading resulted in Br— leachate concentrations less than 1 ppm to almost the detection level (0.5 ppm). Even at 2 wt %, less than 2 ppm of Br— leached out throughout the 40-day column study. (FIG. 9)

This 40-day column study successfully validated the comparative advantage of Br-PAC over benchmarks by demonstrating the exceptional efficiency to stabilize all mercury species in a dynamic system. More importantly, this study confirmed the long term stability of mercury adsorbed by Br-PAC under a wide range of pH.

Various bench scale tests have shown that the brominated PAC can adsorb ionic mercury from an aqueous solution. In the 40-day column study, it was observed that Br-PAC stabilized the source mercury in contaminated soil and adsorbed ionic mercury in contaminated ground water that was passing through the column during the first 7 days.

The SSE analysis done on brominated PAC samples that had been treated showed that all forms of mercury, including the ionic/inorganic and organic, was transformed into non-mobile particle bound mercury. This is further verification that brominated PAC can react with and absorb the mobile forms of mercury which come in contact with the product.

The measured capacity of the brominated PAC is nominally 8 wt % of mercury on the particles. This capacity can be approached when treating soils with 100s to 1000s of ppm mercury. However, even highly contaminated groundwater from a contaminated site is many orders of magnitude lower than contaminated soil. For instance, in the 40-day column study, the HgT in the soil was 600 ppm, while the groundwater from this site was 0.1 ppm (100 ppb), as inorganic (Hg+2). A groundwater mercury concentration of 100 ppb is a very high level of contamination. For comparison, the drinking water standard in California for groundwater used as sources of well water is 2 ppb.

Embodiments

Additionally or alternately, the disclosure can include one or more of the following embodiments.

Embodiment 1. A remediation device for removing environmental pollutants from a mobile phase, having one or more channels that the media flows through, one or more solid structures proximate to the channels, and a reactive media on the solid structure. The reactive media includes a halogen-containing sorbent.

Embodiment 2. A system for remediating a site, where the site has an environmental pollutant to remediate and a mobile phase. The system has a contaminated mobile phase flowing from the site of the environmental pollutant, a treated mobile phase, and a remediation device between the contaminated mobile phase and the treated mobile phase that is configured and disposed to intercept the flow of the contaminated mobile phase. The device has one or more channels that the mobile phase flows through, a solid structure proximate to the channel, and a reactive media on the solid structure. The reactive media includes a halogen-containing sorbent.

Embodiment 3. A process for removing or reducing an environmental pollutant from a mobile media. The process includes installing a remediation device between a first location and second location. The first location contains a higher level of the pollutant than the second location and the mobile phase has the potential to flow or does flow from the first location to the second location. The process also includes allowing the mobile phase to flow through the remediation device. The remediation device has one or more channels that the mobile phase media flows through, one or more solid structures proximate to the channels, and a reactive media on the solid structure. The reactive media includes a halogen-containing sorbent.

Embodiment 4. The devices, processes, or systems of the previous embodiments, wherein the remediation device further includes a support surrounding the solid structure and reactive media.

Embodiment 5. The devices, processes, or systems of the previous embodiments, wherein the mobile phase has a non-neutral pH.

Embodiment 6. The devices, processes, or systems of the previous embodiments, wherein the mobile phase has a pH of less than about 6.5. The pH can be less than about 6.0. The pH can be less than about 5.5 or less than about 5.

Embodiment 7. The devices, processes, or systems of the previous embodiments, wherein the mobile phase has a pH of greater than about 7.5. The pH can be greater than about 8.0. The pH can be greater than about 9.0.

Embodiment 8. The devices, processes, or systems of the previous embodiments, wherein the reactive media is a bromine-containing sorbent, a halogen-containing carbonaceous sorbent, a bromine-containing carbonaceous sorbent, or a bromine containing activated carbon.

Embodiment 9. The devices, processes, or systems of the previous embodiments, wherein the environmental pollutant comprises a toxic metal, a toxic metal compound or toxic metal salt. The environmental pollutant can be comprises elemental mercury, a mercury compound or mercury salt.

Embodiment 10. The devices, processes, or systems of the previous embodiments, wherein the remediation device is a reactive cap, a permeable reactive barrier, a wattle, and/or a purification column.

Embodiment 11. The devices, processes, or systems of the previous embodiments, wherein the mobile media comprises a plume, surface water, overlay water, pore water, ground-water, tailings water, and/or site runoff.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based can be readily utilized as a basis for the design of other structures, methods, and systems for carrying out the several purposes of the embodiments and claims presented in this application. It is important, therefore, that the claims be regarded as including such equivalent constructions.

We claim:

1. A remediation device for removing environmental pollutants from a mobile media, comprising one or more channels that the mobile media flows through, one or more solid structures proximate to each of the one or more channels, and a reactive media on the each of the one or more solid structures, wherein the reactive media comprises a halogen-containing carbonaceous sorbent.

2. The remediation device of claim 1, wherein the device further comprises a support surrounding the one or more solid structures and the reactive media.

3. The remediation device of claim 1, wherein the reactive media is a bromine-containing carbonaceous sorbent.

4. The remediation device of claim 1, wherein the reactive media is a bromine-containing activated carbon.

5. The remediation device of claim 1, wherein the environmental pollutants comprise a toxic metal, a toxic metal compound or toxic metal salt.

6. The remediation device of claim 1, wherein the environmental pollutants comprise elemental mercury, a mercury compound or mercury salt.

7. The remediation device of claim 1, wherein the remediation device comprises a reactive cap, a permeable reactive barrier, a wattle, or combinations thereof.

8. A process for removing or reducing an environmental pollutant from a mobile media, comprising
    installing a remediation device between a first location and second location,
        wherein the first location contains a higher level of the pollutant than the second location and the mobile phase has the potential to flow or does flow from the first location to the second location;
    wherein the remediation device comprises one or more channels that the mobile phase media flows through, one or more solid structures proximate to each of the one or more channels, and a reactive media on the each of the one or more solid structures,
        wherein the reactive media comprises a halogen-containing carbonaceous sorbent.

9. The process of claim 8, wherein the device further comprises a support surrounding the solid structure and the reactive media on the solid structure.

10. The process of claim 8, wherein the mobile media has a non-neutral pH.

11. The process of claim 8, wherein the mobile media has a pH of less than 6.5.

12. The process of claim 8, wherein the mobile media has a pH of greater than 7.5.

13. The process of claim 8, wherein the reactive media is a bromine-containing carbonaceous sorbent.

14. The process of claim 8, wherein the reactive media is a bromine-containing activated carbon.

15. The process of claim 8, wherein the environmental pollutant comprises a toxic metal, a toxic metal compound or toxic metal salt.

16. The process of claim 8, wherein the environmental pollutant comprises elemental mercury, a mercury compound or mercury salt.

17. The process of claim 8, wherein the remediation device is comprises a reactive cap, a permeable reactive barrier, a wattle, or combinations thereof.

* * * * *